United States Patent [19]

Esherick et al.

[11] Patent Number: 4,791,633
[45] Date of Patent: Dec. 13, 1988

[54] POLARIZATION FEEDBACK LASER STABILIZATION

[75] Inventors: Peter Esherick; Adelbert Owyoung, both of Albuquerque, N. Mex.

[73] Assignee: The United States of America as represented by the United States Department of Energy, Washington, D.C.

[21] Appl. No.: 101,535

[22] Filed: Sep. 28, 1987

[51] Int. Cl.$^4$ .............................................. H01S 3/13
[52] U.S. Cl. ........................................ 372/32; 372/18
[58] Field of Search ................. 372/18, 32, 97, 106, 372/29

[56] References Cited

U.S. PATENT DOCUMENTS

| 3,437,955 | 4/1969 | Enloe et al. | 372/29 |
| 3,588,738 | 6/1971 | Goodwin | 372/29 |
| 3,899,748 | 8/1975 | Bodlaj | 372/106 |
| 4,191,928 | 3/1980 | Emmett | 330/4.3 |
| 4,451,923 | 5/1984 | Hansh et al. | 372/32 |
| 4,455,657 | 6/1984 | Byer | 372/18 |
| 4,734,911 | 3/1988 | Bruesselbach | 372/33 |

OTHER PUBLICATIONS

T. Hansch et al., "Laser Frequency Stabilization by Polarization Spectroscopy of a Reflecting Reference Cavity," *Optics Communications*, vol. 35 No. 3, 12/80, pp. 441-444.

Y. Park et al., "Single Axial Mode Operation of a Q-Switched Nd:YAG Oscillator by Injection Seeding," *IEEE Journal of Quantum Electronics*, vol. QE-20, No. 2, 02/84, pp. 117-125.

R. Teets, "Feedback to Maintain Injection Locking of Nd:YAG Lasers," *IEEE Journal of Quantum Electronics*, vol. QE-20, No. 4, 04/84, pp. 326-328.

L. Rahn, "Feedback Stabilization of an Injection-Seeded Nd:YAG Laser," *Applied Optics*, vol. 24, No. 7, 04/01/85, pp. 940-942.

R. Schmitt et al., "Diode-laser-Pumped Nd:YAG Laser Injection Seeding System," *Applied Optics*, vol. 25, No. 5, 03/01/86, pp. 629-633.

*Primary Examiner*—William L. Sikes
*Assistant Examiner*—B. Randolph
*Attorney, Agent, or Firm*—George H. Libman; James H. Chafin; Judson R. Hightower

[57] ABSTRACT

A system for locking two Nd:YAG laser oscillators includes an optical path for feeding the output of one laser into the other with different polarizations. Elliptical polarization is incorporated into the optical path so that the change in polarization that occurs when the frequencies coincide may be detected to provide a feedback signal to control one laser relative to the other.

12 Claims, 3 Drawing Sheets

POLARIZATION FEEDBACK LASER STABILIZATION

The U.S. Government has rights in this invention pursuant to Contract No. DE-AC04-76DP00789 between the Department of Energy and AT&T Technologies, Inc.

BACKGROUND OF THE INVENTION

This invention relates generally to stabilizing the frequency of one laser oscillator with respect to another laser oscillator and, more particularly, to the use of a polarized feedback signal to stabilize a slave laser oscillator with respect to a master laser oscillator.

The application of diode-laser-pumped monolithic Nd:YAG lasers to the injection seeding of laboratory-scale Nd:YAG oscillators is rapidly becoming the preferred method for establishing single-mode operation of these laser systems. The resultant elimination of mode-beating-induced temporal modulation would significantly enhance the precision of almost every optical measurement made with Nd:YAG lasers. The teachings of this invention should find general application to other lasers, as well. In spectroscopic applications, such as coherent Raman and sum- or difference-frequency mixing, the narrow bandwidth available form a single-mode oscillator also becomes attractive. In these latter cases, stable frequency operation may be as important as single-mode operation.

The prior art shows several different approaches to this problem. For example, U.S. Pat. No. 4,455,657 of Robert Byer observed that an injection-seeded high-gain laser had an output frequency determined by a selected cavity mode of the high-gain laser resonator, not the injected frequency of the master oscillator. This knowledge was adapted for long-term frequency stabilization by Y. Park et al., IEEE Journal of Quantum Electronics, Vol. QE-20, No. 2, February 1984, wherein the output frequency of both master and slave oscillators was locked to one side of the transmittance curve of a reference interferometer, the frequency of each oscillator being adjusted by adjusting the cavity length.

Another system is shown by R. Teets, IEEE Journal of Quantum Electronics, Vol. QE-20, No. 4, April 1984, wherein a small detuning between master and slave oscillators is maintained by an optical signal from the master oscillator that increased in magnitude when the master oscillator was resonant with the slave oscillator.

A third system is shown by L. Rahn, Applied Optics, Vol. 24, No. 7, April 1985, wherein the timing of an optical signal from a slave oscillator is used to control the cavity length to maintain single-mode operation.

A problem faced by Park is that his system required a third temperature-stabilized cavity in the feedback loop. A problem faced by the other systems is that the feedback signal does not contain information necessary to indicate the sign of the required correction. As a result, a drift of the control signal from a maximum does not tell the control circuitry which direction the correction should be applied to return to the desired condition. Teets overcame this problem by detuning his device. Rahn overcame the problem by dithering his master oscillator signal at the expense of absolute frequency stability.

SUMMARY OF THE INVENTION

It is an object of this invention to provide a system for using amplitude and polarization of an optical signal to determine the frequency match between two laser oscillators.

It is also an object of this invention to use the polarization properties of an optical signal to provide an asymmetric, "signed", feedback signal for frequency locking two laser oscillators.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a slave laser oscillator for generating a slave laser output and including tuning means for precisely adjusting the frequency of the slave laser output in response to a control signal. A master oscillator is connected for optical injection seeding of the slave oscillator with a master laser signal, and a polarizer linearly polarizes a portion of the slave laser output, for feedback to the master oscillator, thus providing a probe signal at a first polarization. The master laser oscillator also provides a resonant amplification of the probe signal at a second polarization different from said first polarization when the frequency of said probe signal is equal to the frequency of said master laser signal. Changes in the amplitude and polarization state of said probe signal resulting from interaction with said master laser signal are detected by a detector to provide the control signal to said tuning means.

BRIEF DESCRIPTION OF THE DRAWINGS

The accompanying drawings, which are incorporated in and form part of the specification, illustrate an embodiment of the present invention and, together with the description, serve to explain the principles of the invention.

DETAILED DESCRIPTION OF THE INVENTION

Figure 1:
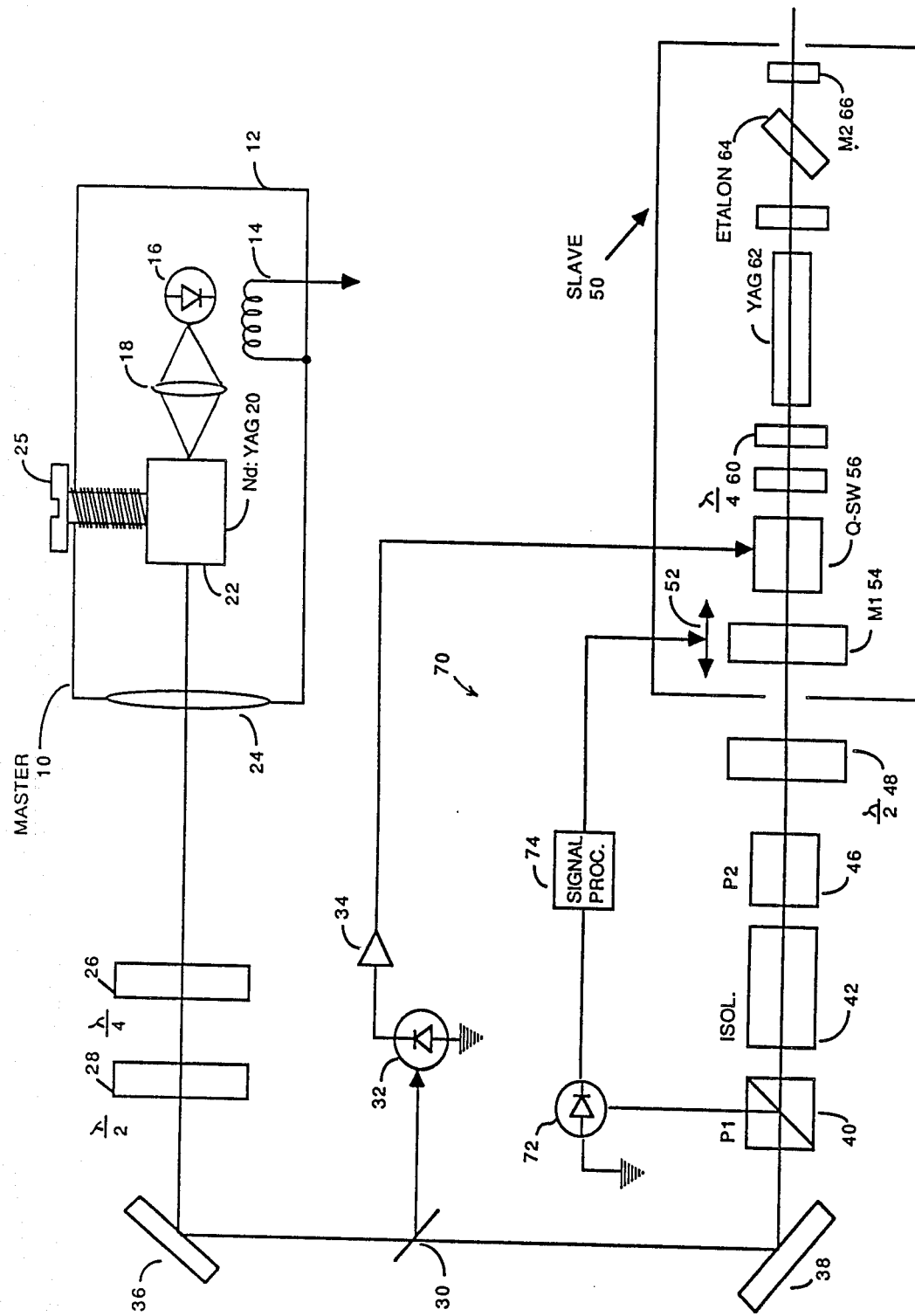
FIG. 1 shows a schematic representation of the invention.

FIG. 1 shows the apparatus of this invention to include a master oscillator 10 optically coupled by mirrors 36 and 38 through polarizer 40 to a slave oscillator 50. A feedback circuit 70 controls the frequency of slave oscillator 50. It is understood by those of ordinary skill in this art that mirrors 36 and 38 serve only as reflectors to permit the optical signal to change direction. These mirrors may be omitted, or other mirrors added, in accordance with the desired configuration of the system.

Master oscillator 10 may be a monolithic Nd:YAG laser cavity 20 pumped by a laser diode 16 through a graded-index (GRIN) lens 18. Oscillator 10 includes temperature-insulated case 12 and heater 14 to accurately control the temperature, and, therefore, the frequency, of cavity 20 by varying control voltage $V_H$. A set screw 25 may be used to apply mechanical strain to cavity 20 to ensure that the laser output is linearly polarized. Lens 24 collimates the laser output into a beam.

Slave oscillator 50 may comprise a commercially available Nd:YAG laser such as a Quanta-Ray DCR-1A having a cavity longitudinal mode spacing of 120 MHz. This laser includes a low-finesse (20% R, 3 mm) etalon 64 for coarse mode control. (An etalon functions as an optical comb filter, passing multiple wavelengths dependent on the length of the etalon.) Quarter-wave plates 60 function to suppress spatial hole burning as is well known in the art. The standard rear reflector mirror of this oscillator is replaced by a partially (e.g. 2%) transmissive mirror 54 to allow for coupling of the laser output from master oscillator 10. A tuning device, such as piezoelectric translator 52, is provided to adjust the spacing between rear mirror 54 and front mirror 66 in response to a control signal, and thereby provide a mechanism for varying the cavity mode frequencies of oscillator 50. Lasing is provided by Nd:YAG rod 62 when Q-switch 56 is energized in a manner well known in this art.

As shown in FIG. 1, half-wave plate 28 rotates the angle of polarization of the output of master oscillator 10 relative to mirrors 36 and 38 and polarizer 40. The output of oscillator 10 passes through polarizer 40 to Faraday isolator 42, a magnetic device providing, with polarizers 40 and 46, approximately 90% transmission for light passing from master oscillator 10 to slave oscillator 50, and only $10^{-4}$ transmission for high power light passing the other direction. The output of Faraday isolator 42 is further rotated by half-wave plate 48 to match the transmitted light to the polarization of slave oscillator 50.

A Q-switch trigger signal is taken from beam splitter 30 through diode 32 and amplifier 34 in a manner well known in this art.

Feedback circuit 70 includes a photodiode 72 for converting light to an electrical signal, and a signal processor 74 to convert the transient electrical signal into a dc control voltage for mirror translator 52.

Figure 2:
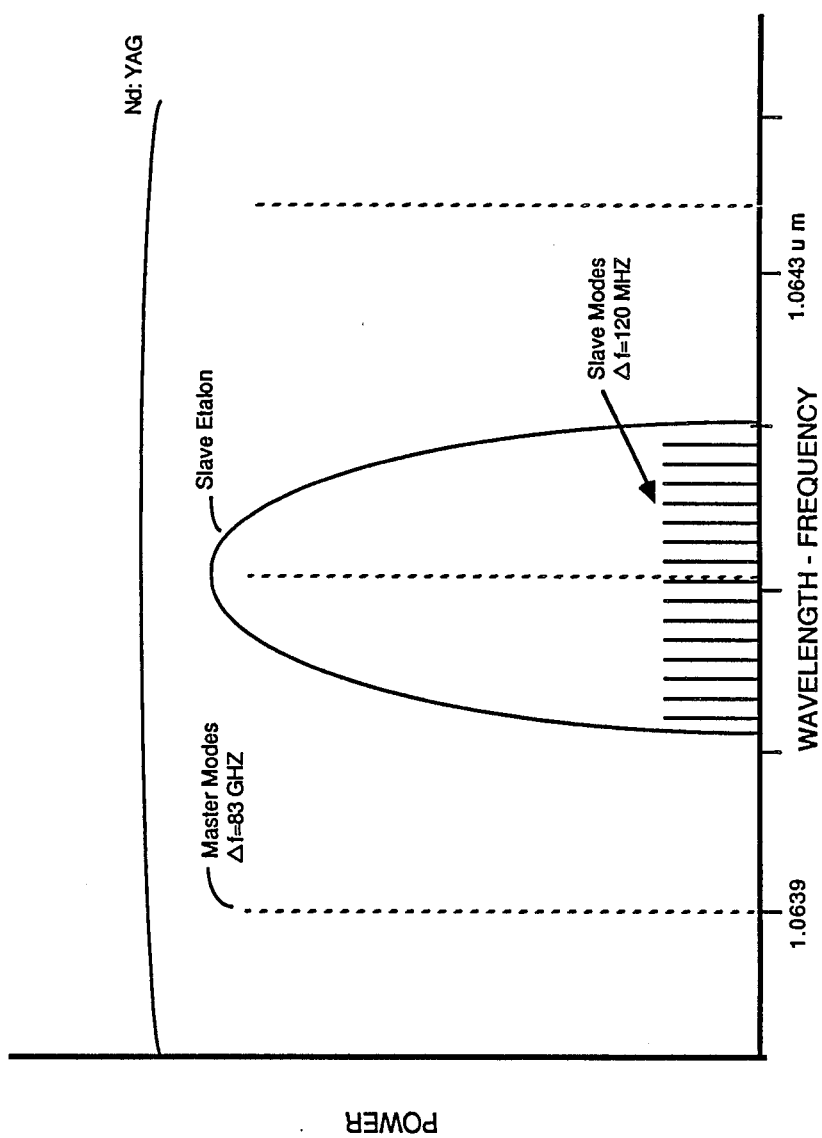
FIG. 2 shows the relationship between the outputs of the master and slave oscillators.

The relationship between the outputs of the two oscillators may be understood by reference to FIG. 2, which figure shows slave oscillator 50 to inherently provide a plurality of output frequencies approximately 120 MHz apart (as determined by the length of cavity 62) for a range of wavelengths between 1.0639 and 1.0643 um. These outputs are limited to a narrower range by the pass band of etalon 60, as shown.

Master oscillator 10 also has a Nd:YAG cavity and, therefore, operates over the same wavelength range as slave oscillator 50. However, because cavity 20 is much shorter (about 1 mm) than cavity 62, the cavity mode spacing for this oscillator is about 83 GHz. Accordingly, only one output frequency from oscillator 10 lies within the pass band of etalon 60. The master frequency may be tuned to coincide with one gain maximum of the slave oscillator.

The critical elements for understanding the operation of the invention are cavity 20 of master oscillator 10 and polarizer 40. Since the output of master oscillator 10 is linearly polarized, cavity 20 functions as a birefringent etalon with two orthogonal linear eigenpolarizations, one of which lases to produce the output of the oscillator. It should be understood that any laser medium with resonant gain in only one polarization may function as the master oscillator.

In operation, a 10 mW output from master oscillator 10 triggers slave oscillator 50 through Q-switch 56. If an output frequency of master oscillator 10 lies within the pass-band of etalon 64, slave oscillator 50 is seeded by this frequency. As shown in FIG. 2, the output of master oscillator 10 is close to one of the many possible outputs of slave oscillator 50, and the slave oscillator lases at that output as discussed in Teets, op. cit.

A portion of the slave laser pulse output is transmitted through mirror 54 back to Faraday isolator 42. Although it is severely attenuated by transmission in the backward direction through isolator 42, the slave laser output is transformed into a linearly polarized probe signal of a first polarization by polarizer 40. This 10 W, 10 ns probe signal is then transmitted to cavity 20 of master oscillator 10.

If the frequency of the probe signal is different from the frequency of the master oscillator signal, the probe signal simply reflects from surface 22 of cavity 20. Since the polarization of the directly reflected signal is unchanged, it passes back through polarizer 40 without deflection and detection by detector 72. However, if the frequencies are substantially equal (depending on the Q of the resonator), part of the Probe signal reflects while the remaining part resonates in cavity 20 and is regeneratively amplified, providing a much greater amplitude output (20–30 W pulse power) from master oscillator 10 of a second polarization. In either event, the phase and polarization of the pulse signal from the master oscillator is a combination of the master oscillator output at the second polarization and the reflected probe signal at the first polarization. Each of these pulse signals is so much larger than the original master oscillator output that the contribution of the 10 mW output to the phase and polarization of the combined signal may be ignored.

Figure 3A:
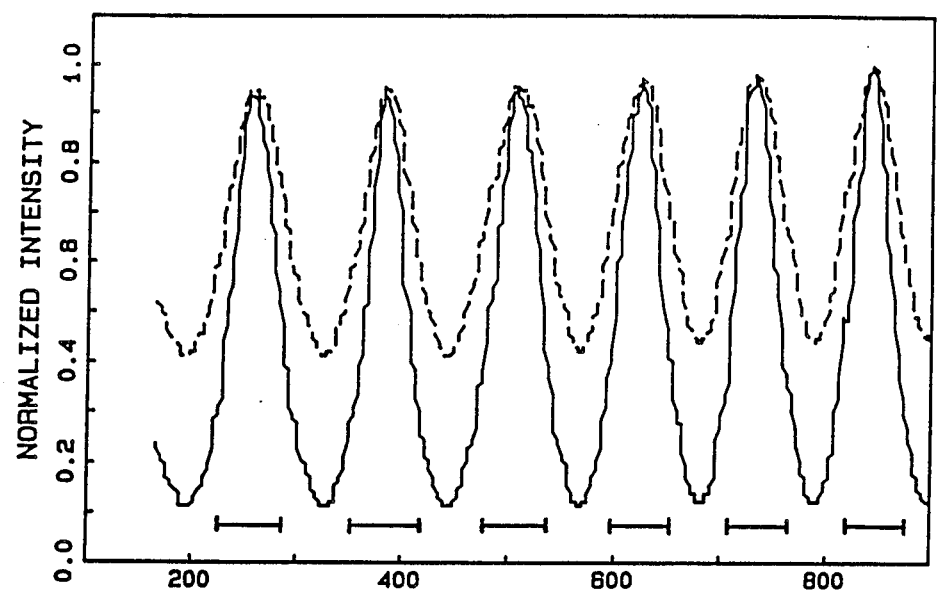
FIG. 3a shows a symmetrical feedback signal as a function of slave laser cavity length.

The regeneratively amplified probe signal at the second polarizer is coupled by polarizer 40 to detector 72. FIG. 3a shows the output of detector 72 (solid curve) and the total intensity emitted from master oscillator cavity 20 as measured by detector 32 (dotted curve) as a function of the tuning voltage applied to translator 52, which voltage is proportional to cavity length of slave oscillator 50. Quarter-wave retarder 26, as discussed hereinafter, was not in the optical path for these measurements. The solid bars at the bottom of the figure show the regions of the cavity length scan where slave oscillator 50 is running on a single axial mode as determined by pulse output shape. As the cavity length is scanned, oscillator 50 runs in a single mode for a time, and then breaks into two oscillating modes, and then returns to single-mode operation as the frequency of the next-order mode scans into coincidence with the injected frequency.

Although the polarization signal (solid curve) exhibits both good signal-to-noise ratio and good contrast between the on-resonance and off-resonance conditions, the center of the master oscillator resonance occurs precisely at the peak of the polarization signal. Accordingly, like both Teets and Rahn, this signal cannot be used directly in a feedback control system.

Figure 3B:
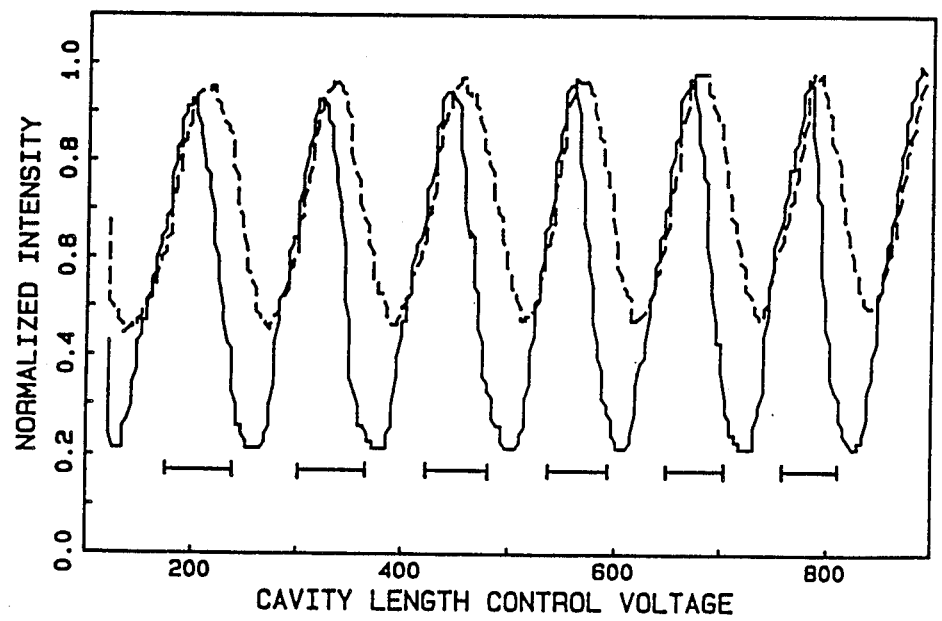
FIG. 3b shows an asymmetrical feedback signal as a function of slave laser cavity length.

In accordance with a preferred embodiment of the invention, the polarization resonance signal may be shifted as shown in FIG. 3b such that the center of the resonance condition coincides with the steepest part of the resonance signal. The direction of drift can then be determined by signal processor 74 to provide a control signal to adjust the frequency of slave oscillator 50 to maintain resonant conditions.

The conditions of FIG. 3b are obtained by first aligning half wave plate 28 to minimize the signal at photodiode 72 both for on-resonance and off-resonance conditions. In other words, the first polarization of the probe signal is adjusted to be equal to the second polarization of the master oscillator. Wave retarder 26 is then added to the optical circuit at an angle, typiclly, of about 10° for the first polarization. In the Preferred embodiment, wave retarder 26 is a quarter-wave plate; however, any $\lambda/n$, $n>2$, plate should function as wave retarder 26.

The function of quarter wave retarder 26 is to create a detectable baseline signal at detector 72. This signal is created because wave retarder 26 elliptically polarizes the probe signal from slave oscillator 20, which signal is reflected from front surface 22 of cavity 20 as discussed above. After passing through wave retarder 26 again, the reflected signal is linearly polarized at a third polarization distinct from the original (first) polarization of the probe signal. This signal is diverted by polarizer 40 to detector 72 to serve as a baseline signal. Since the probe signal is reflected from cavity 20 whether or not there is resonance, this baseline signal is always present at detector 72.

When the oscillator frequencies are equal, the portion of the probe signal transmitted through the front surface 22 of cavity 20 resonates in the cavity and is regeneratively amplified, producing a high-level output signal of the second polarization, as discussed above. The regeneratively amplified signal is colinear with the directly reflected probe signal, and these signals coherently interfere as they are detected by detector 72. Since the phase shift introduced by a $\lambda/n$ wave retarder is dependent on polarization, an additional constant phase shift is added between the directly reflected probe signal and the regeneratively amplified signals passing through wave retarder 26. For frequencies of the probe signal that are slightly off resonance (e.g. different from the frequency of master oscillator 10), the optical phase of the regeneratively amplified signal is slightly shifted with respect to the optical phase of the directly reflected signal. The result is a measurable asymmetry in the observed signal at detector 72 as a function of the detuning or frequency difference between the frequencies of master oscillator 10 and slave oscillator 50.

The processing of this signal may be accentuated, while also making the signal less sensitive to amplitude fluctuations, by electronically dividing the signal at detector 72 by the total reflected energy signal observed with detector 32. Alternatively, the signal levels from detectors 32 and 72 may be balanced and compared. Accordingly, signal processor 72 may comprise a boxcar integrator, comparator, or other known device having an electrical output connected to adjust the tuning device of slave oscillator 50 as is well known to those of ordinary skill in the control art.

As disclosed above, quarter-wave retarder 26 provides the elliptical polarization that causes the detectable phase shift between the two signals. Alternatively, half-wave plate 28 may be skewed slightly to provide this polarization. The resulting detection is done in a manner similar to the teachings of Hansch et al., "Laser Frequency Stabilization by Polarization Spectroscopy of a Reflecting Reference Cavity," Optics Communications, Vol. 35, No. 3, December 1980, pp. 441–444, which reference shows the use of a quarter-wave retarder to polarize a signal to lock a laser to an external etalon.

The preferred embodiment of the invention provides a feedback system using polarization discrimination to lock the frequencies of master and slave laser resonators of an Nd:YAG laser system. Since the system does not require frequency dithering, it is well suited for applications requiring stable, single frequency, operation.

The particular sizes and equipment discussed above are cited merely to illustrate a particular embodiment of this invention. It is contemplated that the use of the invention may involve components having different sizes and shapes as long as the principle, using polarization differences to provide a feedback signal, is followed. For example, there are many possible arrangements of the master and slave oscillators, and several ways in which they may be coupled. Furthermore, the master oscillator may be tuned by means other than temperature tuning, as is known in the art. It is intended that the scope of the invention be defined by the claims appended hereto.

We claim:

1. A system for locking the frequencies of two lasers comprising:
   slave laser oscillator means for generating a slave laser output, said oscillator means including tuning means for precisely adjusting the frequency of said slave laser output in response to a control signal;
   master laser oscillator means for optical injection seeding said slave oscillator with a master laser signal;
   polarizer means for linearly polariziing a portion of the slave laser output to provide a probe signal at a first polarization;
   optical means for directing said probe signal to said master laser oscillator, said master laser oscillator further comprising means for providing a resonant amplification of said probe signal at a second polarization different from said first polarization when the frequency of said probe signal is equal to the frequency of said master laser signal; and
   detector means for detecting changes in the amplitude and polarization state of said probe signal resulting from interaction with said master laser oscillator; and
   control means responsive to an output of said detector means for providing the control signal to said tuning means.

2. The system of claim 1 wherein said master laser oscillator comprises a birefringent temeperature stabilized monolithic Nd:YAG cavity pumped by a laser diode, said master laser signal being outputted from one end of said cavity.

3. The system of claim 2 wherein said slave laser oscillator comprises a Nd:YAG laser having a cavity defined by front and rear mirrors, said tuning means comprising means for moving one mirror to adjust the length of said cavity in response to said control system.

4. The system of claim 3 wherein said probe signal is aligned with said master laser signal.

5. The system of claim 4 wherein said slave laser rear mirror is partially transmissive, said probe signal being transmitted through said rear mirror.

6. The system of claim 5 further comprising isolator means for transmitting the signal from said master laser oscillator towards said slave laser oscillator while attenuating the signal from said slave laser oscillator towards said master laser oscillator.

7. The system of claim 6 wherein said isolator means comprises a Faraday isolator.

8. The system of claim 1 wherein said detecting means comprises polarizing means for passing a signal of the first polarization and reflecting a signal of a polarization normal to said first polarization to said detector means.

9. The system of claim 1 wherein said master laser oscillator reflects said probe signal, and further comprising means for shifting the phase of each of said reflected probe signal and said master laser oscillator output relative to their plarizations.

10. The system of claim 9 wherein said means for shifting the phase consists of means for elliptically polarizing said probe signal; and
said detector means further comprising means for interfering said reflected probe signal and said master oscillator signal, wherein the output of said detector has a measurable asymmetry as a function of the frequency difference between said master and slave oscillators.

11. The system of claim 10 wherein said means for elliptically polarizing comprises wave retarding means, located between said polarizing means and said master oscillator, for changing the phase of the reflected probe signal.

12. The system of claim 11 wherein said means for elliptically polarizing consists of a quarter-wave plate.

* * * * *